(12) United States Patent
Agg

(10) Patent No.: US 7,430,867 B2
(45) Date of Patent: Oct. 7, 2008

(54) GAS TURBINE MULTIPLE SECTIONED EXHAUST DUCT

(75) Inventor: Michael John Agg, Bristol (GB)

(73) Assignee: Rolls-Royce plc, London (GB)

( * ) Notice: Subject to any disclaimer, the term of this patent is extended or adjusted under 35 U.S.C. 154(b) by 552 days.

(21) Appl. No.: 11/010,454

(22) Filed: Dec. 14, 2004

(65) Prior Publication Data

US 2005/0155352 A1    Jul. 21, 2005

(30) Foreign Application Priority Data

Jan. 21, 2004    (GB) ................... 0401272.0
Nov. 25, 2004    (GB) ................... 0426172.3

(51) Int. Cl.
*F02K 1/00*    (2006.01)
(52) U.S. Cl. .................. 60/770; 403/348; 138/108
(58) Field of Classification Search ............... 60/770; 138/108, 120; 123/184.21; 403/348–350
See application file for complete search history.

(56) References Cited

U.S. PATENT DOCUMENTS

| | | | | |
|---|---|---|---|---|
| 1,255,577 A * | 2/1918 | Berry | ................. | 285/107 |
| 3,301,940 A * | 1/1967 | Rischard et al. | .............. | 174/78 |
| 3,329,967 A * | 7/1967 | Martinez et al. | .............. | 2/2.15 |
| 3,785,407 A * | 1/1974 | Waite et al. | ................. | 138/108 |
| 4,356,885 A | 11/1982 | Dello | | |
| 4,739,801 A * | 4/1988 | Kimura et al. | .............. | 138/120 |
| 4,834,069 A * | 5/1989 | Umeda | ................. | 600/142 |
| 5,704,208 A * | 1/1998 | Brewer et al. | ................ | 60/766 |
| 6,003,559 A * | 12/1999 | Baker | ................. | 138/108 |
| 6,041,590 A * | 3/2000 | Hayton et al. | ................ | 60/766 |
| 6,516,606 B2 * | 2/2003 | Fournier et al. | ............... | 60/262 |
| 6,732,764 B2 * | 5/2004 | Miyamoto et al. | ............. | 138/110 |
| 6,883,550 B2 * | 4/2005 | Bekki et al. | ................. | 138/120 |
| 2002/0117229 A1 * | 8/2002 | Luettgen et al. | ........... | 138/DIG. 8 |
| 2006/0112676 A1 * | 6/2006 | Cowan et al. | ................ | 60/266 |
| 2006/0237084 A1 * | 10/2006 | Hoffmann | ................ | 138/112 |
| 2007/0175929 A1 * | 8/2007 | Schram | ................. | 222/527 |

* cited by examiner

*Primary Examiner*—William H Rodríguez
(74) *Attorney, Agent, or Firm*—Oliff & Berridge, PLC

(57) ABSTRACT

A duct comprising an inner casing spaced apart from an outer casing and which also comprises a number of interfaced duct sections must be assembled in such a way to prevent relative redial movement between the casings and thereby inhibit buckling. The present invention is a duct which utilises abutment members which longitudinally extend from each of the inner walls across the interface of the duct sections. The abutment members are radially spaced apart in normal use but are configured such that substantially relative radial movement of the inner and outer walls is prevented when the overlapping members abut.

9 Claims, 2 Drawing Sheets

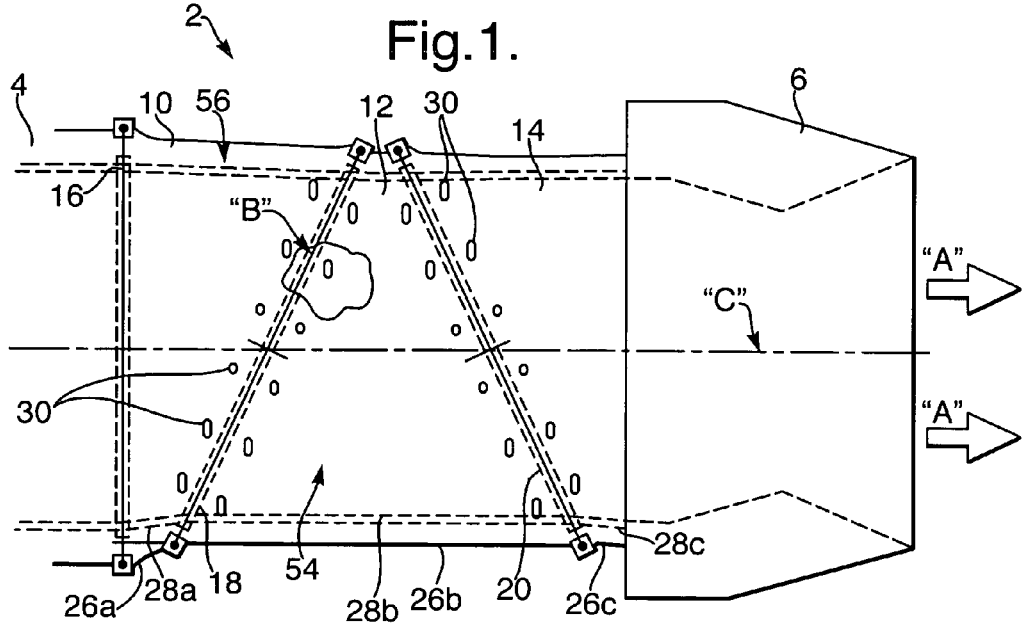
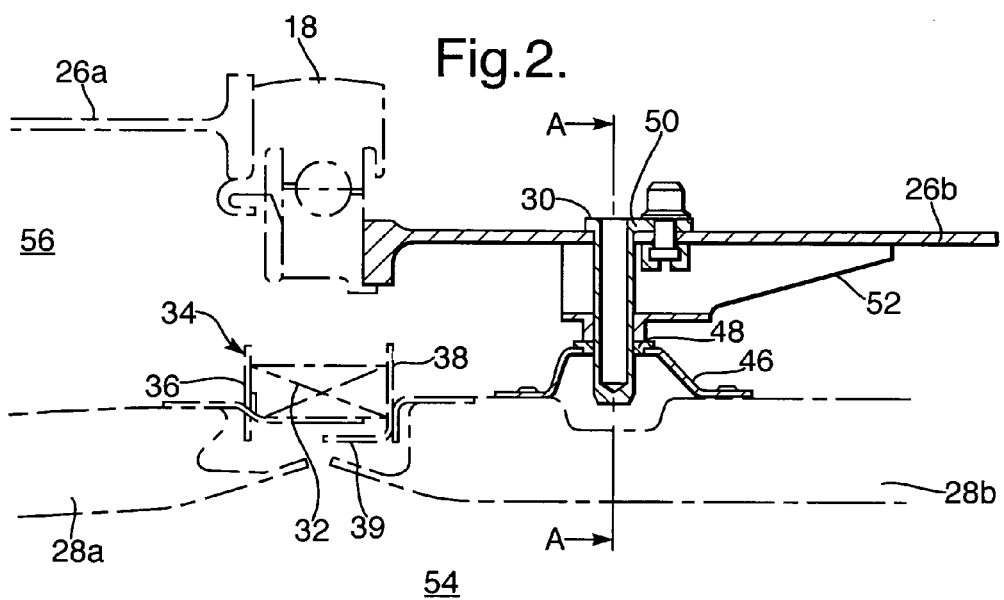

GAS TURBINE MULTIPLE SECTIONED EXHAUST DUCT

The invention relates to a duct.

In particular the invention relates to an exhaust duct.

In a particular problem addressed by the invention an annular outer casing of an exhaust duct provides support for an annular inner casing.

An exhaust duct is mounted on a downstream end of an engine. Air enters the engine, is compressed and mixed with fuel. The fuel-air mix is ignited before being exhausted out of the rear of the engine via the exhaust duct. Hot exhaust gas passes down an inner duct defined by the annular inner casing and cooling air passes down an outer annular duct annulus formed between the outer casing and inner (or "liner") casing. The cooling air is provided at a slightly higher pressure than the hot exhaust gas such that cooling air passes through numerous holes in the liner from the outer duct to the inner duct, but not from the inner duct to the outer duct. During severe engine transients a temporary high pressure difference between the outer duct and the inner duct may be generated. Hence the liner must be supported by the outer casing by some means capable of withstanding a force induced due to the high pressure difference, thereby preventing relative radial movement of the inner and outer casing and inhibiting buckling of the inner and outer casing.

Conventionally this is achieved by providing an array of radial hangers between the liner and casing distributed evenly over the liner surface. This solution has significant demerit because it involves the use of a large number of fixings which adds weight to the overall structure. During normal operation the hangers introduce thermal stresses in the liner at the point of connection to the hanger. During an engine transient the hangers introduce bending stresses in the liner at the point of connection to the hanger.

Further problems arise using conventional means of supporting the liner in an exhaust duct which comprises a number of relatively rotatable sections where the sections interface along a plane which is at an angle to the radial plane of the ducts ("scarf joints").

Since the duct sections interface is at an angle to a radial plane, loads on the liner during an engine transient are transverse to the engine centreline and push adjacent liners across into each other, thereby further increasing the bending stresses on the hangers in the region where the hanger is connected to the liner.

Hereinbefore and hereafter a radial plane is taken to mean a plane perpendicular to the longitudinal axis of the exhaust duct, "upstream" means in the direction of the air intake of the engine, and "downstream" means in the direction of the engine exhaust.

In accordance with the present invention there is provided a duct comprising at least two interfaced duct sections rotatably mounted relative to one another, each of which comprises an outer wall radially spaced apart from an inner wall, said inner and outer walls defining a substantially annular outer duct, and a substantially annular inner duct, wherein abutment members longitudinally extend from each of the inner walls across the interface of the duct sections, said members being radially spaced apart in normal use and are configured such that substantial relative radial movement of the inner and outer walls is prevented when the overlapping members abut.

Preferably the inner wall is located on the outer wall by a ring of radially orientated pins substantially adjacent to the interface of the duct sections.

Preferably the interface of the at least two duct sections is at an angle to the radial plane of the ducts.

The present invention provides a means for mounting a liner onto a duct casing such that a minimum of fittings and fitting features are required. The present invention thereby reduces the overall weight of the duct as well as simplifying manufacture and assembly.

Additionally the present invention provides a means for inhibiting extreme relative radial movement of duct sections during transient pressure loads on the liner by providing snub features adjacent to the duct sections interface, and, by providing longitudinally overlapping abutment members along the seal of the duct interface.

The invention and how it may be carried into practice will now be described in greater detail with reference, by way of example, to embodiments illustrated in the accompanying drawings, in which:

FIG. 1 shows a duct according to the present invention as mounted on the downstream end of an engine with an engine nozzle mounted on the downstream end of the duct;

FIG. 2 shows an enlarged cross-section of an interface between two adjacent sections of the duct according to the present invention.

Figure 3:
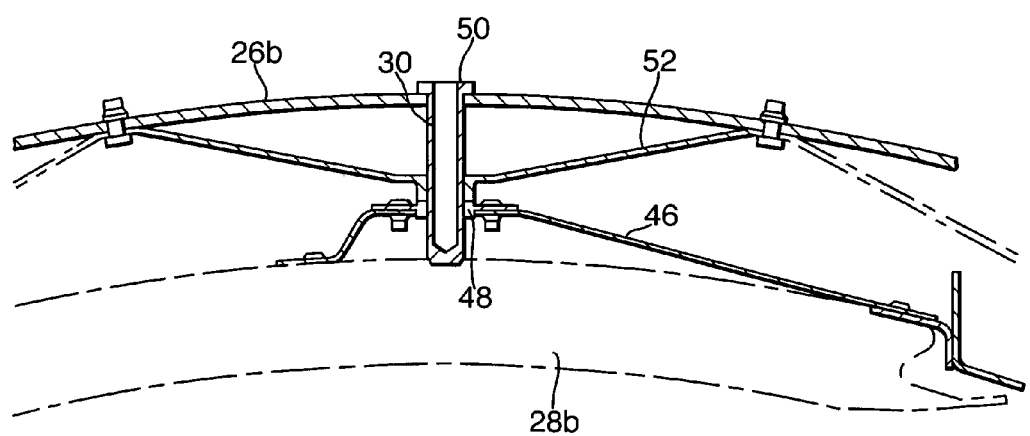
FIG. 3 shows a cross-section of a mounting pin according to the present invention as viewed at A-A in FIG. 2.

FIG. 1 illustrates a duct 2 according to the present invention, having a duct centre line generally indicated at "C". The duct 2 which, in this non limiting example, is an exhaust duct, is mounted on a downstream end of an engine 4. An engine nozzle 6 is mounted on the downstream end of the exhaust duct 2. The overall construction and operation of the engine 4 is of a conventional kind, well known in the field, and will not be described in this specification beyond that necessary to gain an understanding of the invention. For the purposes of this description it is sufficient to say that air enters the engine 4, is compressed and mixed with fuel. The fuel-air mix is ignited before being exhausted out of the rear of the engine in the direction indicated generally by arrow "A".

The duct 2 comprises three interfaced duct sections, hereafter referred to as a first duct section 10, second duct section 12 and third duct section 14. The three duct sections 10,12,14 are arranged in series such that the first section 10 is rotatably mounted to the downstream end of the engine 2 by a first bearing arrangement 16; the second section 12 is rotatably mounted on the first duct section 10 by a second bearing arrangement 18; and the third duct section 14 is rotatably mounted to the second duct section 12 by a third bearing arrangement 20. The exhaust nozzle 6 is attached to the downstream end of the third duct section 14.

The first, second and third duct sections 10,12,14 each comprise an outer walls 26a, 26b, 26c respectively (commonly referred to as "casings") which surround and are radially spaced apart from inner walls 28a, 28b, 28c respectively (commonly referred to as "liners"). The first, second and third bearing arrangements 16,18,20 are mounted on the outer walls 26a, 26b, 26c.

In the embodiment presented in FIG. 1, by way of example, the interface between the first section 10 and the second section 12, and the interface between the second section 12 and the third section 14, are at an angle to the radial plane of the duct centre line "C". The inner walls 28a-c are supported from the outer walls 26a-c by a ring of pins 30 adjacent to the interface between the first and second duct sections.

Presented in FIG. 2 is a cross-sectional view of the exhaust duct 2 in the region indicated by arrow "B" in FIG. 1. A sealing member 32 is provided at the interface between adjacent inner walls 28a and 28b, radially inward and spaced apart from the respective bearing arrangement 18. The sealing member 32 is retained in a seal housing 34 which comprises a seal retaining member 36 attached to an inner wall 28a and abuts a seal face member 38 on an adjacent inner wall 28b. The seal face member 38 is provided with an abutment member 39 which extends upstream beneath the radially inner face of the seal retaining member 36, which also acts as an abutment member. Hence the radially inner face of seal retaining member 36 and the abutment member 39 overlap longitudinally and are radially spaced apart.

In a particular embodiment the radially inner face of the seal retaining member 36 and the abutment member 39 are radially spaced apart in the range of about 1 mm to no more than about 10 mm. Preferably the radially inner face of the seal retaining member 36 and the abutment member 39 are radially spaced apart by about 2 mm.

The pins 30 are spaced around the scarf joint plane with a constant axial pitch rather than angular pitch to equalise pin loads. The pins 30 are retained on the outer wall 26b by attaching a flanged outer end 50 of the pins 30 to the outer wall 26b by some appropriate means. The pin 30 engages with the inner wall 28b and is re-enforced with a casing bracket 52 provided on an outer wall 26b. Each pin 30 supports the inner wall 28b at its radially inner end by insertion into a liner bracket 46 fixedly joined to inner wall 28b. In a preferred embodiment the pin 30 is located with a bush 48 retained by the bracket 46.

Presented in FIG. 3 is a cross sectional view of the pin mounting arrangement as viewed at A-A in FIG. 2. The liner bracket 46 reinforces the inner wall 28b and the casing bracket 52 provides support and rigidity to the pin 30.

It will be appreciated that the pins 30 and bearing arrangements elsewhere on the first, second and third duct sections 10,12,14 are arranged in a similar way.

In operation hot exhaust gas passes down an annular inner duct 54 defined by the inner wall 28 and cooling air passes down an outer annular duct 56 defined by the inner wall 28 and the outer wall 26. The brackets 46,52 are configured and positioned to offer minimum obstruction to the axial cooling flow. The cooling air is provided at a slightly higher pressure than the hot exhaust gas such that cooling air gas passes from the outer duct 56 through numerous holes in the inner walls 28a-c into the inner duct 54 defined by the inner walls 28a-c, but hot gas does not pass from the inner duct 54 to the outer duct 56. During severe engine transients (eg engine surge in a gas turbine engine) a large pressure difference between the outer ducts 56 and the inner duct 54 is generated. Because of the geometry of the interfaces between the first, second and third duct sections 10, 12, 14, the inner walls 28a-c are pushed across into each other. In this eventuality the overlapping abutment members 36,39 will come into contact and resist any further relative radial movement of the inner walls 28a-c.

During assembly and normal operation, the pins 30 locate the inner walls 28a-c on the outer wall 26a-c. The pins 30 prevent the inner walls 28a-c and the outer walls 26a-c moving relative to one another and also prevent buckling by resisting tangential shear and axial loads induced by the any pressure differential between the inner and outer ducts. Additionally, the casing and liner bracket 46,52 will act as snub features. Under extreme loads the relative radial movement of the outer and inner walls 26a-c,28a-c will cause the casing and liner bracket 46,52 to be brought into contact with one another, thereby preventing relative radial movement beyond a pre-determined and desirable value.

The advantage of the present invention is that liner pressure loads are carried efficiently within the inner walls 28a-c by transverse plane hoop loads in interface regions between the inner walls 28a-c, and the hoop loads are reacted at the radial pins 30. This avoids bending of the inner walls 28a-c. Additionally the pins 30 are mounted such that they permit stress free thermal expansion of the outer walls 26a-c without sacrificing support stiffness.

The present invention also has the advantage that the radial pin holes can be machined into a finished casing and liner as identical sets, so the assembly alignment of the pins is accurate and independent of prior fabrication distortion.

Additionally the present invention utilises a minimum number of fixings leading to reduced cost, weight and assembly times. It will be appreciated that the pins 30 may be retained in the liner and casing by any suitable method. The pins 30 may be threaded at the outer end and screwed into a threaded boss riveted inside the casing. The boss may carry a friction locking ring at the thread.

An alternative pin support on the casing has larger diameter pins which are supported by bosses alone in the machined casing flanges, with no additional brackets. Each pin may be flanged and retained by the bolts in casing inserts.

Although aspects of the invention have been disclosed with reference to the embodiment shown in the accompanying drawings, it is to be understood that the invention is not limited to the precise embodiment and that various change and modifications may be affected without further inventive skill and effort. For example, the invention may be used on any device requiring a sectioned and/or articulated duct, including but not limited to, any type of engine. Likewise an engine fitted with a duct according to the present invention may be fitted to any type of air, seal or land based vehicle.

The invention claimed is:

1. A duct, comprising:
   at least two interfaced duct sections rotatably mounted relative to one another, each of which includes an outer wall radially spaced apart from an inner wall, the inner and outer walls defining a substantially annular outer duct, and a substantially annular inner duct, such that a radial plane is formed,
   wherein abutment members longitudinally extend from each of the inner walls across the interface of the duct sections such that the abutment members overlap, the abutment members configured such that in a first relative position the abutment members are radially spaced apart from each other and in a second relative position the overlapping members abut such that substantial relative radial movement of the inner and outer walls is prevented.

2. The duct as claimed in claim 1, wherein the inner wall is located on the outer wall by a ring of radially orientated pins substantially adjacent to the interface of the duct sections.

3. The duct as claimed in claim 1, wherein the interface of the at least two duct sections is at an angle to the radial plane of the ducts.

4. The duct as claimed in claim 1, wherein a sealing member is provided at the interface of the inner walls which, in use, prevents an uncontrolled flow of fluid between the inner and outer ducts.

5. The duct as claimed in claim 4, wherein the sealing member is retained within a sealing housing which is integral with at least one of the abutment members.

6. The duct as claimed in claim 1, wherein the inner wall is supported on the outer wall by a ring of snub features substantially adjacent to the interface of the duct sections.

7. The duct as claimed in claim 6, wherein the radially orientated pins locate the snub features.

8. The duct as claimed in claim 1, wherein the duct forms part of an engine.

9. The duct as claimed in claim 1, wherein the duct forms part of a gas turbine engine.

* * * * *